Aug. 14, 1951     J. B. MULLEN     2,564,495
DEFERRED ACTION PRIMARY BATTERY
Filed Feb. 27, 1947     3 Sheets-Sheet 1

INVENTOR,
John B. Mullen,
BY
Jesch and Darbo
Attys.

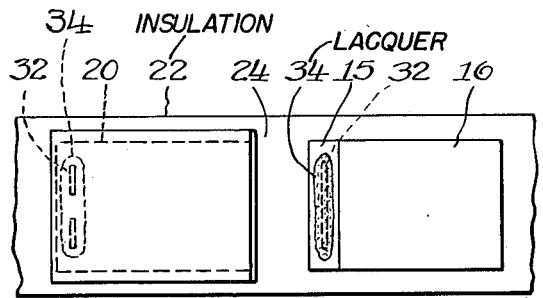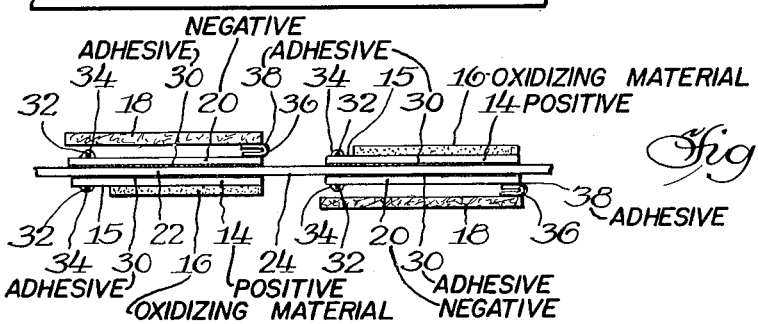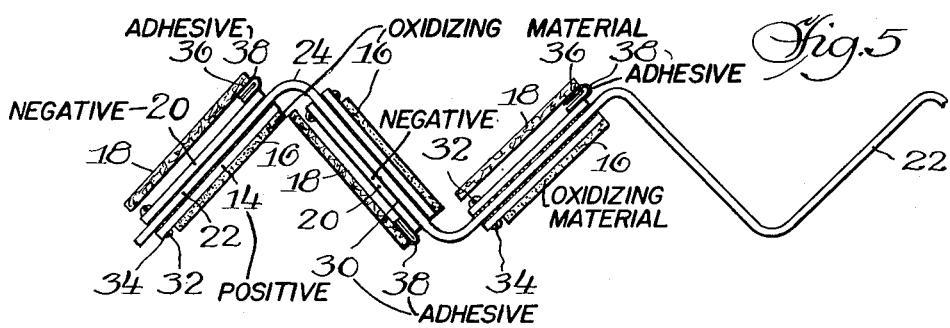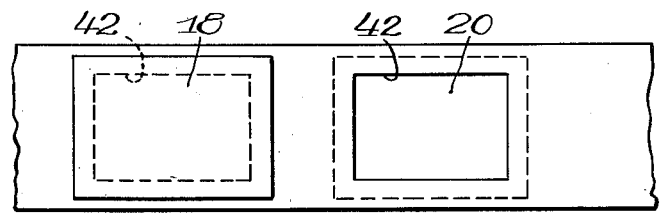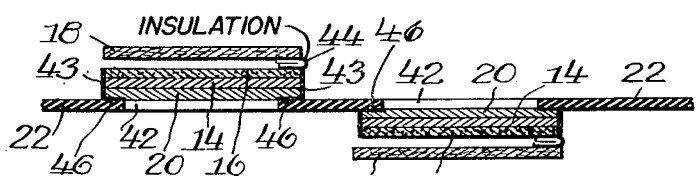

Aug. 14, 1951   J. B. MULLEN   2,564,495
DEFERRED ACTION PRIMARY BATTERY
Filed Feb. 27, 1947   3 Sheets-Sheet 3
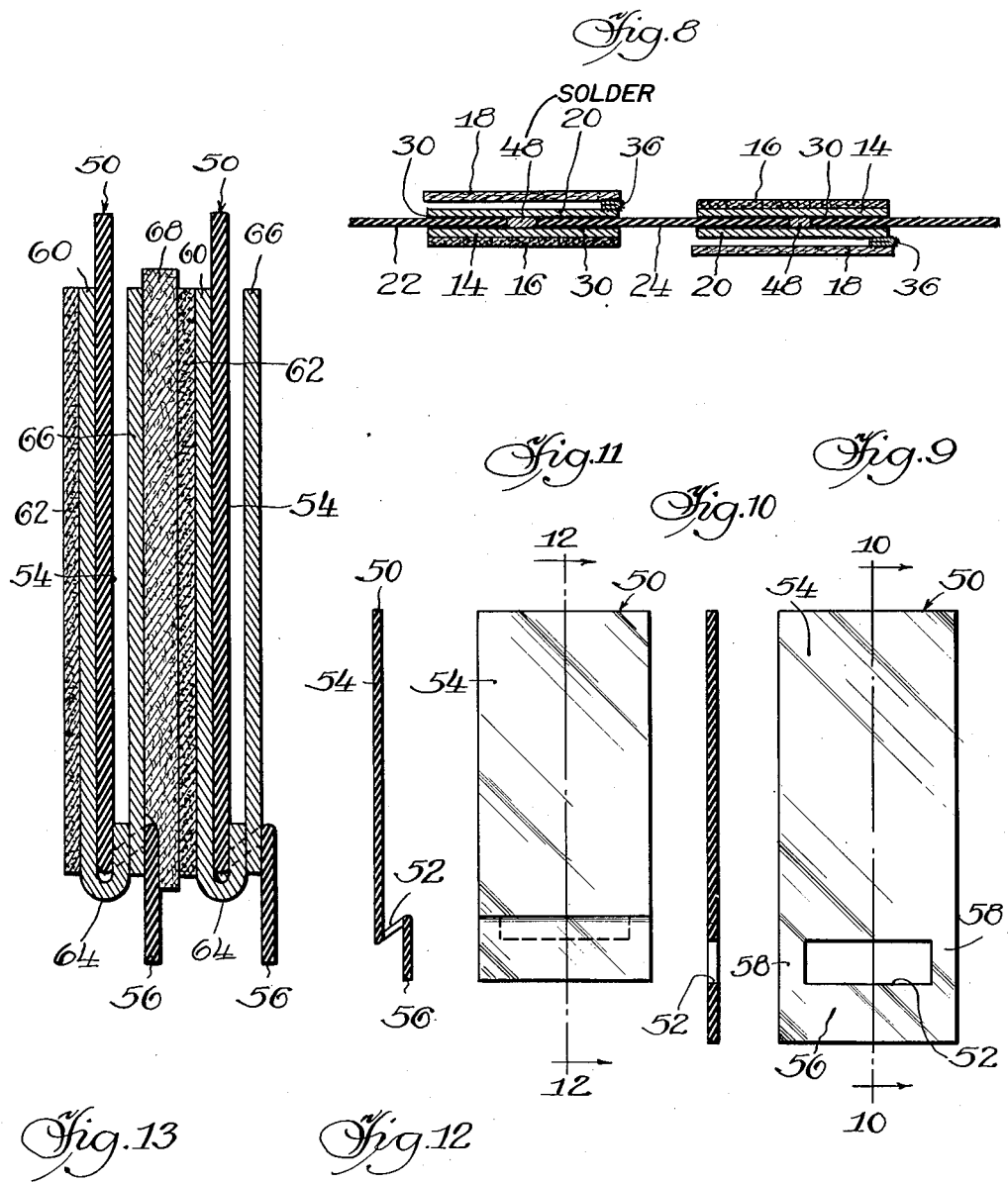
INVENTOR.
John B. Mullen
BY
Tesch and Darbo Attys.

Patented Aug. 14, 1951

2,564,495

UNITED STATES PATENT OFFICE 2,564,495

DEFERRED ACTION PRIMARY BATTERY

John B. Mullen, Chicago, Ill., assignor, by mesne assignments, to Burgess Battery Company, Freeport, Ill., a corporation of Delaware Application February 27, 1947, Serial No. 731,290

3 Claims. (Cl. 136—90)

This invention relates to primary batteries of the deferred action type and particularly to improvements in a multiple cell high voltage battery which is adapted to be activated by being dipped in a body of activating liquid or otherwise brought in contact with an activating liquid.

In a high voltage battery, such as a B battery for radio or other electronic apparatus, the cells are connected in series and the different cells are at different potentials. In a deferred action battery of this type, it is a great convenience to be able to activate all of the cells simultaneously by means of a common source or body of activating liquid. This is accompanied by the difficulty, however, that there may be a continuity of the activating liquid from one cell to another, and if this is the case the activating liquid possesses sufficient conductivity that destructive short circuits will be present.

It is an object of the invention to provide a multiple cell battery of the character described, which is capable of delivering high voltage and also of delivering a high output of current.

It is a further object of the invention to provide a battery of the character described having improved construction for the prevention of short circuits when the cells are activated by means of a common body of activating liquid.

It is a further object of the invention to provide, in a battery of the character described, an improved construction and arrangement of the elements which is simple and economical from the standpoint of both structure and manufacture, and which results in improved performance of the battery.

Other objects and advantages will become apparent as the following description progresses, which is to be taken in conjunction with the accompanying drawings, in which:

Figs. 3 and 5, are side views of the assembly of the cell elements at different stages in the manufacture of the battery;

Fig. 4 is a top view of the structure shown in Fig. 3;

Figs. 6 and 8 are side sectional views of the assembled cell elements of two modifications respectively, of the invention, in a preliminary stage in the formation of the battery;

Fig. 7 is a top view of the assembly shown in Fig. 6;

Figs. 9 and 11 are front views of a non-conductive cell separating member for a further modification of the invention at different stages in the manufacture of the battery;

Figs. 10 and 12 are sectional views along lines 10—10 and 12—12, respectively, of Figs. 9 and 11; and Fig. 13 is an enlarged sectional elevational view of a portion of a battery employing the separating member shown in Figs. 9 to 12.

Figure 1:
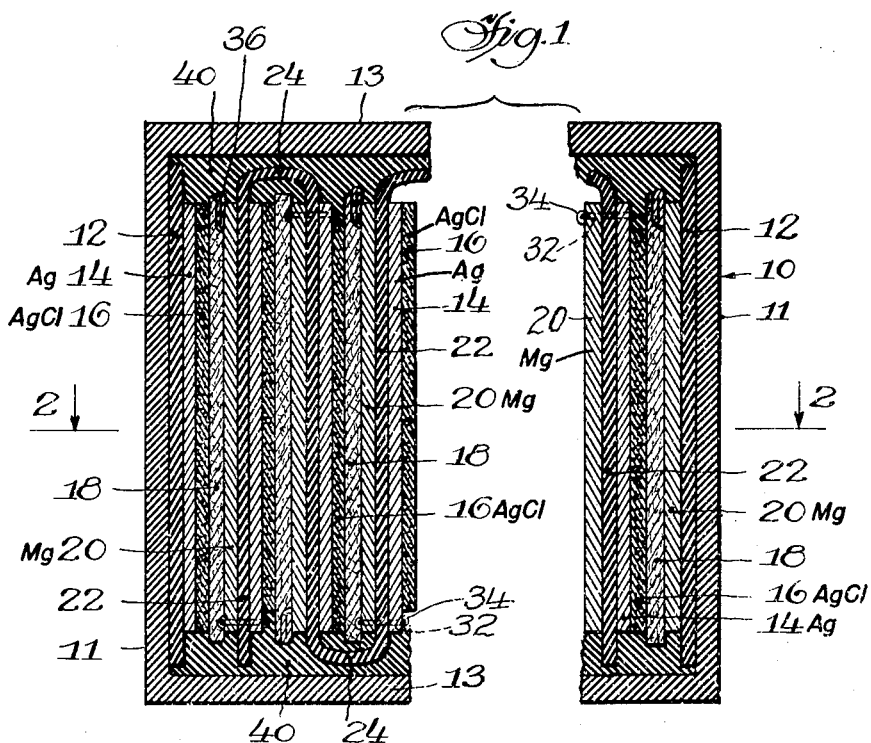
Fig. 1 is an elevational sectional view, taken along line 1—1 of Fig. 2, of the improved battery construction of the invention.
Figure 2:
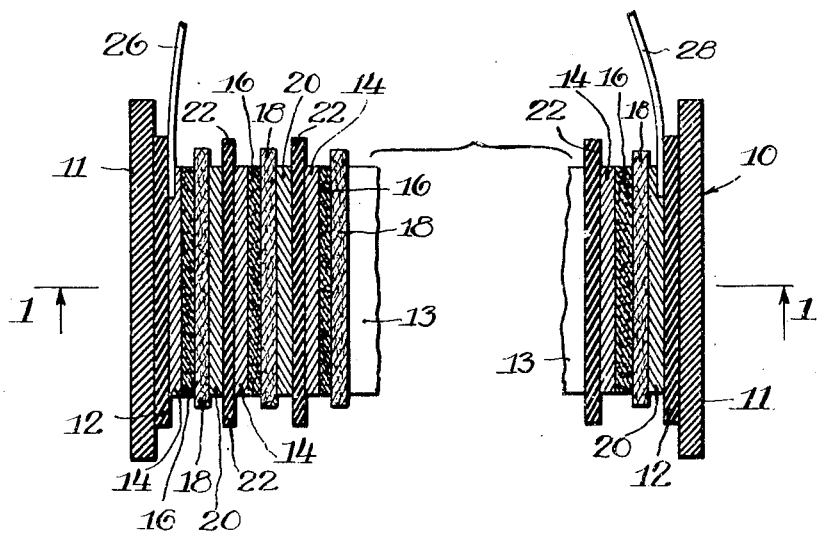
Fig. 2 is a plan sectional view taken along line 2—2 of Fig. 1.

The preferred form of the battery is shown in Figs. 1 and 2 and consists of an open-sided shell 10 composed of a non-conductive, electrolyte resistant material, such as stiff paraffin impregnated paperboard, or a resin, such as polystyrene, polymerized methyl methacrylate, the copolymer of vinyl chloride and vinyl acetate, phenol formaldehyde, or the like. The shell 10 may be of any desired shape, but in the specific construction shown is of rectangular shape and comprises the two end walls 11 and the top and bottom walls 13, and is open upon the two sides, as shown in Fig. 2. The top and bottom walls 13 are preferably narrower than the end walls for a reason which will be pointed out hereinafter.

The cell elements are in the form of thin, flat sheets or plates, and are arranged in juxtaposed relation to form a stack thereof extending from one end of the shell to the other. Starting at one end of the shell, the first element is a sheet of non-conductive electrolyte resistant material 12, which may be composed of a thin film of a film-forming material, such as the rubber hydrochloride composition known as Pliofilm, the copolymer of vinyl acetate and vinyl chloride, polymerized methyl methacrylate, or the like. The thickness of the element 12 and of the other elements of the battery is exaggerated in the drawings for the purpose of clearness.

The second element is the positive cell electrode 14, which may be composed of carbon, silver, gold, platinum, or the like, and is smaller in both length and width than the non-conductive element 12, the arrangement being such that the edges of element 12 extend a substantial distance beyond the edges of electrode 14 in all directions, that is, upon the top, bottom and two sides. The electrode 14 preferably has the thickness of thin metal foil.

The next element is the layer of oxidizing material 16, which is coextensive with the electrode 14. The material 16 performs the depolarizing function in the cell. The active material 16 may be composed of a water insoluble oxidizing agent, such a silver chloride, silver bromide, silver iodide, silver sulfide, or the like.

The next element is the sheet of bibulous non-conductive material 18, which may be composed of blotting paper. The sheet 18 may have a thickness greater than that of the other elements. The oxidizing material 16 and bibulous sheet 18 serve to absorb and retain the electrolyte, whereby the cell is made active. Preferably, the edges of the bibulous sheet 18 extend slightly beyond the edges of the oxidizing layer 16 to insure that the entire area of the active elements on the opposite sides of the sheet 18 is utilized, and also that the sheet 18 comes in ready contact with and absorbs the activating liquid when the battery is dipped into said liquid.

The next element is the negative electrode 20, which may be composed of a suitable metal, such as magnesium, calcium or barium, or alloys in which such metals are the base. Magnesium is preferred, because it is readily available and imparts strong energy delivering powers to the battery.

The elements 14, 16, 18 and 20 make up a single cell, and the next element is a flexible non-conductive sheet 22, which is similar in composition to the sheet 12, and preferably contains a suitable plasticizer to impart flexibility. The sheet 22 serves to separate the first cell from the second cell. The elements of each of the succeeding cells are similar to the corresponding elements of the first cell, and are designated by the same numerals.

The separating material 22 between the adjacent cells is not in the form of individual sheets, like end sheet 12, but is in the form of a continuous strip or ribbon folded back and forth, to form the loops 24, the successive loops being located at the top and bottom, respectively, of the battery. This type of structure facilitates the manufacture of the battery, and will be described in detail hereinafter. The separating member 22 extends beyond the edges of the cell elements upon all sides of the assembly so as to form an effective separator, as will be described more fully hereinafter. The end members 12 also preferably extend beyond the edges of the cell elements.

When employing the elongated ribbon of flexible non-conductive material 22, the cell elements are applied to the ribbon when it is in its extended condition, and the elements are brought into their juxtaposed positions by folding the ribbon back and forth in a zig-zag manner, that is, each succeeding fold is turned in the opposite direction from the last. The method of assembling and arranging the elements in the juxtaposed relationship is illustrated in Figs. 3 to 5. While only a short section of the non-conductive ribbon 22 is shown in the figures, in practice the method is carried out upon an elongated ribbon which preferably is of sufficient length to carry all of the cells required for one battery, except for the elements at each end, which are preferably mounted upon the separate non-conductive end members 12, which are shown in Figs. 1 and 2. The ribbon may also be of indefinite length and may be cut into sections of any length as desired.

Referring to Figs. 3 and 4, in the first stage of the process, a negative electrode 20 is applied to one side of the ribbon 22, the arrangement being such that the edge portions of the ribbon extend beyond the edges of the electrode, as described heretofore, and as shown in Fig. 4. The electrode is attached to the ribbon 22 by means of a suitable non-conductive and electrolyte-resisting adhesive 30, such as polymerized methyl methacrylate resin or the copolymer of vinyl acetate and vinyl chloride, dissolved or dispersed in a suitable volatile solvent, a polystyrene or nitrocellulose lacquer, or the like. On the side of ribbon 22 opposite from electrode 20 is arranged a positive electrode 14 having affixed thereto the layer of oxidizing material 16. The electrode 14 is also attached to the ribbon by the adhesive 30. In the preferred cell construction, the positive electrode is composed of silver and the oxidizing layer is composed of silver chloride and is previously formed in situ upon the silver electrode by anodizing one side of the latter, using a dilute solution of an alkali metal chloride, such as sodium chloride, as the electrolyte and a second silver element as the other electrode. The opposite surface of the electrode 14 is protected against the anodizing action by coating it with a protecting substance, such as paint or lacquer. Preferably, the anodizing action is prevented at the end portion 15 of the first surface in a similar manner, this portion 15 being kept free of silver chloride for reasons which will be explained hereinafter. The protective layer is removed preferably before the element is attached to the ribbon 22.

A second group of elements 14, 16 and 20 are attached to the ribbon 22 at a location spaced longitudinally of the ribbon from the first group of elements by a distance equal to one of the loops 24. The elements of the second group are arranged on the opposite sides of the ribbon 22 from the corresponding elements of the first group, that is, the negative electrode 20 of the second group is arranged on the opposite side of the ribbon 22 from the negative electrode 20 of the first group, and so forth. Such alternate arrangement is continued along the length of the ribbon.

At the next succeeding stage in the process of assembly, a staple 32 is driven through the uncoated portion 15 of the element 14, the ribbon 22 and the element 20, and the ends of the staple are folded down into tight contact with the element 20, as indicated in dotted lines in Fig. 4. The staple may be driven through the elements in the opposite direction from that described. The staple is composed of a suitable conductive metal, such as copper or brass, and serves as a conductor to electrically connect the electrodes 14 and 20 together. The staple makes firm electrical contact with the bare surface of the portion 15 of the electrode 14. As an alternative, a rivet or eyelet may be used in place of the staple 32.

In the next stage of the process, a coating of a non-conductive substance 34, such as lacquer or any of the resins mentioned heretofore, is applied to the exposed portions of the staple 32. This is for the purpose of preventing the penetration of the electrolyte, or activating liquid, into the openings formed when the staple 32 is driven through the elements, and protecting the junctions between the staple and the respective electrodes against contact with the electrolyte, which would result in local action and corrosion of the electrodes and the staple.

In the next stage in the process, a short piece of flexible non-conductive sheet material 36 is attached to the end portion of the negative electrode 20 opposite from the staple 32, by means of an adhesive 38. A portion of the piece 36 is arranged to extend beyond the electrode 20 and is folded back upon itself into the form of a loop, and is attached by the adhesive 38 to the end portion of the bibulous sheet 18. The arrangement is such that the sheet 18 is in superposed relation to the electrode 20. In the preferred construction, the attaching piece 36 is a thin sheet of flexible non-conductive material similar to the material of which ribbon 22 is composed, having a coating of pressure sensitive adhesive upon the surface thereof which is in contact with the elements 18 and 20.

While only two of the groups of elements are shown in Figs. 3 and 4, this is done to show the opposite arrangement of each succeeding group upon the ribbon 22, and it is understood that a continuous succession of the groups of elements may be arranged upon a ribbon of indefinite length.

Fig. 5 illustrates the next stage in the assembly of the battery. The ribbon 22 is bent at each of the fold portions 24, each succeeding fold portion being turned in the opposite direction to create a zig-zag arrangement. In Fig. 5, the folds 24 have been only partially completed. The completion of the folds brings the oxidizing element 16 of one group of elements into contact and juxtaposed relationship with the bibulous element 18 of the next succeeding group of elements. This results in the assembly of the element 14 and 16 of one group and the elements 18 and 20 of the adjacent group into a cell, and the simultaneous assembly of a succession of the cells into an elongated stack.

Prior to the introduction of the assembled elements into the shell 10, an end element 12, having the elements 14 and 16 of the first cell attached thereto by an adhesive, in a manner similar to that described in connection with the elements illustrated in Figs. 3 and 4, is applied to one end of the folded stack, and a second non-conductive element 12 with the elements 20 and 18 attached thereto is applied to the other end of the folded stack to complete the assembly shown in Fig. 1. The cells are connected together in series by the staples 32. A conductor 26 is connected, as by welding or soldering, to the posisive electrode 14 of the first cell and projects outwardly from a side of the battery, and a second conductor 28 is similarly connected to the negative electrode 20 of the last cell and extends outwardly from a side of the battery. The conductors 26 and 28 form the terminals of the battery and are adapted to be connected to the external circuit or load.

This assembly of elements is compressed longitudinally to the proper battery length and inserted in the shell 10. The final arrangement is such that the elements are pressed together between the end walls of the shell, and the assembly is held firmly in place. The bibulous sheets 18, being composed of a relatively soft material, such as blotting paper, are locally depressed to accommodate the folded attaching pieces 36 and the staples 32 and their non-conductive coverings 34, as is shown in Fig. 1.

Masses or layers of an adhesive 40 are applied to the top and bottom edges of the assembly. The layers 40 are of a thickness substantially sufficient to fill the spaces between the stack of elements and the top and bottom walls of the shell 10. In the preferred procedure, the stack is compressed by a frame or jig and the adhesive 40 applied before the stack is inserted in the shell. The adhesive 40 may be composed of the copolymer of vinyl acetate and vinyl chloride, polymerized methyl methacrylate, polystyrene, or the like, softened by a suitable solvent. The assembly is allowed to stand until the adhesive has set, and then it is removed from the frame or jig and inserted into the shell 10. Such arrangement leaves two opposite sides of the battery substantially entirely open to the surrounding space whereby the edges of the cell elements and of the ribbon 22 are exposed for contact with a body of activating liquid.

While the adhesive 40 is shown as being applied to the top and bottom of the stack of cell elements, it may be applied to one of the sides also, leaving only one side exposed for dipping into the activating liquid. In such case, a longer dipping time is required to absorb the desired amount of activating liquid. As another alternative, the adhesive 40 may be omitted from all four sides of the stack, in which case other suitable means should be provided to retain the stack in its form and position.

When it is desired to use the battery, the terminals 26 and 28 are connected to the load circuit, and the battery is dipped into a body of suitable activating liquid, which may be a dilute aqueous solution of a salt, such as the alkali metal chlorides, sulfates, etc., depending upon the electrode system employed. The specific battery described heretofore, consisting of magnesium and silver electrodes and a silver chloride oxidizing agent, is adapted to be activated by plain water, and the battery may be dipped in fresh water or the salt water of the ocean for activating purposes. It is preferably dipped in such manner that the edges of the bibulous elements 18 at both sides of the battery are brought in contact with the activating liquid, and it is held in contact with the liquid for a sufficient time to permit the absorption of enough liquid to thoroughly moisten the bibulous layers 18. This usually requires less than a minute of time. Then the battery is removed from the activating liquid and shaken to eject the excess liquid after which it is in operatvie condition. It may be connected to the external circuit after the dipping operation, as well as before, and it substantially immediately delivers its full voltage and power.

One of the most important features of the invention is the provision of the non-conductive separating member 22 having edge portions projecting a substantial distance beyond the corresponding edges of the active cell elements which it serves to separate, that is, the elements 14, 16 and 20. It has been found that with such an arrangement, objectionable short circuit currents are avoided. If the exposed edges of the separating member 22 were to substantially coincide with the corresponding edges of the active cell elements, the electrolyte would creep across the exposed edge of each separating member and form a bridge between the elements of adjacent cells. For example, such a bridge would be formed between the electrode 20 of one cell and the electrode 14 of the adjacent cell. These two electrodes would then be in electrical connection with each other by means of the staple 32 and in electrolytic connection with each other by means of the bridge of electrolyte, so that a cell would be formed in which the two electrodes were short circuited. Such action would result in the rapid consumption of the electrode 20 and the depolarizer 16 without the production of any useful electrical energy.

In addition, the bridges of electrolyte would form a conductive connection between cells which are remote from each other and at widely different potentials, resulting in objectionable short circuits. It has been found that if the separating member 22 extends a distance of $\tfrac{1}{32}$ inch or more beyond the edges of the adjacent cell elements such bridging action is avoided and there is none of the objectionable results described above. It is preferred that the edges of the member 22 extend at least as far as do the edges of the bibulous element 18.

Similarly, the provision of relatively narrow top and bottom walls 13 assists in avoiding objectionable short circuit currents. If such walls were to extend beyond the edges of the electrodes 14 and 20, electrolyte would cling to the extending portion and form bridges between the electrodes, with the objectionable results mentioned heretofore. Therefore, the walls 13 preferably do not extend beyond the edges of the electrodes 14 and 20, as shown in Fig. 2. If desired, they may be narrower than shown in Fig. 2, so that the edges of the electrodes 14 and 20 extend beyond the edges of the walls 13. The end walls 11 are preferably at least as wide as the end elements 12 so as to provide adequate end support for the assembly.

Another important feature of the invention is the arrangement in accordance with which the cell elements are mounted upon a continuous ribbon of the separating non-conductive material 22 and the latter is folded in a zig-zag pattern to bring the elements into the juxtaposed relationship which is their final arrangement in the battery. Such construction is simple and economical and provides a battery having superior properties and performance characteristics. In addition, production is simplified and is more rapid and economical.

As an alternative to the construction which has been described heretofore, the arrangement shown in Figs. 6 and 7 may be employed. In this, the ribbon of non-conductive material 22 has rectangular openings 42 formed therein at regularly spaced intervals equal to the intervals between the groups of elements in the previously described construction. The openings 42 are of a size somewhat smaller than the cell elements. Over one of the openings is arranged a group of elements comprising the negative electrode 20, the positive electrode 14, the oxidizing layer 16 and the absorbent sheet 18. In this group of elements, the oxidizing layer 16 is formed upon the positive element 14 in the manner described heretofore, and the element 14 is attached to the negative element 20 by a spot welding or soldering operation, which is preferably carried out after the oxidizing layer 16 is formed upon the element 14. The heat for the welding or soldering operation may be applied through the negative electrode 20. The coinciding edges of the elements 20, 14 and 16 are covered with a layer of non-conductive, electrolyte resistant material 43, such as lacquer or any of the resin substances mentioned heretofore. The absorbent sheet 18 is atached to the oxidizing layer 16 by means of the attaching piece 44, similar to the attaching piece 36 described heretofore.

The group of elements is arranged to cover the opening 42 and have its marginal portions overlie the material of the ribbon 22 surrounding the opening 42. Such marginal portions are attached to the ribbon by means of an adhesive 46, similar to the adhesive 30 described heretofore.

A similar group of elements is attached to the opposite surface of the ribbon 22 and arranged to cover the next succeeding opening 42. A sufficient number of the groups of elements are arranged upon a length of ribbon to form a battery, or as many may be applied as is desired, and the ribbon is then folded in a zig-zag pattern, in the same manner as is illustrated in Fig. 5, and the folding operation is completed to bring the cell elements into juxtaposed relation and pressure contact to form a battery. As described heretofore, the thickness of the elements is exaggerated for clearness and the non-conductive ribbon 22 is preferably in the form of a thin film having a thickness of the order of .002 to .010 inch, and the bibulous sheets 18 are readily depressed to accommodate the thickness of the film so that the surface of each element 18 is in suitable pressure contact with the negative electrode 20 of the adjacent group for the functional activity of the battery. The folding of the ribbon leaves the battery incomplete in the same manner as described heretofore in connection with the structure of Figs. 1 and 2, and the battery can be completed by providing the end members 12 with their attached cell elements. The assembly may be inserted in the shell 10 in the same manner as described heretofore.

Another alternative construction is illustrated in Fig. 8. In this construction, the elements are cemented to the ribbon 22 and attached to each other in the same manner as described heretofore in connection with the construction of Figs. 1 to 5, with the exception that the cement 30 is omitted at a portion of the ribbon 22 and an opening is provided in the ribbon at that portion. A small amount of solder 48 is applied to the surface of one of the elements 14 and 20 at said portion, and after the elements are in position, they are heated to soften the solder 48 and form a conductive connection between the two elements. Alternatively the two elements may be welded together through the opening in the ribbon 22. The structure also differs from that of Figs. 1 to 5 in that the oxidizing layer 16 is coextensive with the positive element 14, and there is no area 15 at which the oxidizing layer is omitted.

Each succeeding group of elements is spaced longitudinally upon the ribbon 22 to provide sufficient of said ribbon for a fold 24, and successive groups of elements are arranged oppositely on the ribbon, that is, the element 20 of one group is arranged on the opposite side of the ribbon 22 from the element 20 of the succeeding group, and the same is true of the other cell elements. The ribbon 22 is folded in a zig-zag pattern and the remainder of the operations and structure is similar to that which has been described heretofore in connection with the battery of Figs. 1 and 2.

In the modification shown Figs. 9 to 13, a continuous ribbon of the non-conductive separating material is not employed, but individual rectangular pieces 50 of the thin non-conductive material are employed between the cells. The separating member 50 has a width substantially equal to that of the ribbon 22 and a length substantially greater than the length of the cell elements. A rectangular opening 52 is provided in the member 50 adjacent to the bottom end thereof, said opening being adapted to accommodate the width of the cell elements and having a relatively short dimension extending longitudinally of the member 50. The member 50, therefore, comprises a main, or primary section 54, and an end or secondary section 56, the two sections being connected by the webs 58 at the sides of opening 52.

In the construction of the battery, a positive element 60 is formed having an oxidizing layer 62 attached to one surface thereof. The positive element extends beyond the oxidizing layer 62 at the bottom end thereof and is turned back upon itself to form the loop 64. The loop 64 is connected as by welding or soldering to the negative element 66 in end-to-end relationship, the negative element being substantially parallel to and coextensive with the positive element 60. The two elements are spaced apart and the primary section 54 of the non-conductive separating member 50 is arranged between them. The webs 58 of the separating member 50, where they join the main section 54, are turned in the direction of the negative element 66 and inclined slightly upwardly, and where they are joined to the secondary section 56, they are turned downwardly so that the secondary section 56 extends vertically downward in parallel, offset relation to the primary section 54. A bibulous separating member 68, similar to the member 18 described heretofore, is arranged adjacent to the negative element 66 and a second series of elements similar to that described heretofore, consisting of a positive element 60, an oxidizing layer 62, separating member 50 and negative element 66 is arranged adjacent to the bibulous layer 68. Such a succession of elements is continued until the desired number have been assembled, and the proper end elements are applied, whereby a battery is formed. The stack of elements is placed under suitable pressure, when the bibulous layers 68 become locally depressed to accommodate the secondary portions 56 of the separating members 50, and the negative electrodes 66 are brought into firm contact with the primary sections 54 of the adjacent separating members 50. Such compression is preferably applied by means of a jig, as described heretofore, and the top and bottom edges of the elements fixed in their relative positions and provided with an insulating cover, by applying thereto a non-conductive, viscous setting adhesive similar to the adhesive masses 40 in the structure of Figs. 1 and 2.

In the structure of Fig. 13, the upper edge portion of the secondary section 56 of the separating member 50 overlaps the lower edge portion of the primary section 54, whereby the separating member, with its edge portions extending to the sides beyond the edges of the cell elements, provides a substantially continuous barrier against the formation of bridges between cells by the electrolyte.

The invention is not limited to the specific system of electrodes and depolarizer described. Any other suitable system may be used, such as the system of the Leclanché cell, and a suitable electrolyte solution may be used as the activating liquid.

What is claimed is:

1. A multiple cell primary battery adapted for simultaneous activation of the cells thereof by contact with a common body of activating liquid, comprising a plurality of juxtaposed primary cells each having a side thereof substantialy entirely open to the surrounding space for contact with said activating liquid during said activating operation, each cell comprising flat cell elements including a positive electrode and a negative electrode, the positive electrode of one cell being electrically connected to the negative electrode of the adjacent cell, said cell elements having substantially their entire edges upon said open side unobstructedly exposed to said space, means for separating the respective cells of said battery and preventing the formation of bridges of activating liquid between the exposed edges of said electrically connected electrodes consisting of sheet-form, non-conductive members between said connected electrodes and having flat edge portions exposed throughout substantially their entire length to said space and projecting at least $\frac{1}{32}$ inch beyond said exposed edges of said connected electrodes, said separating members being in the form of a continuous ribbon folded back and forth, each succeeding fold extending in the opposite direction and along the succeeding intercell boundary.

2. A multiple cell primary battery comprising a plurality of flat cell elements arranged in stacked relation and forming a plurality of assembled series-connected primary cells, an elongated, flexible, non-conductive ribbon, said ribbon being flat in transverse section, said cell elements being mounted upon said ribbon in spaced apart groups along the length of said ribbon, said ribbon being folded at the spaces thereof between said groups, each successive fold being turned in the opposite direction from the last, whereby said groups are arranged in stacked relation and said ribbon serves as a separator between the respective cells of the battery, said assembly of cells having a side thereof substantially entirely open to the surrounding space, the edges of said cell elements and of said ribbon at said open side of said cell assembly being exposed along substantially their entire length to said space, the exposed edges of said ribbon projecting at least $\frac{1}{32}$ inch beyond the exposed edges of the cell elements adjacent thereto.

3. A multiple cell primary battery comprising a plurality of flat cell elements arranged in stacked relation and forming a plurality of juxtaposed series-connected primary cells, an elongated, flexible, non-conductive ribbon, said ribbon being flat in transverse section, said cell elements being mounted upon said ribbon in groups at spaced apart intervals along the length of said ribbon, a pair of said groups of elements being located at each of said intervals, the members of said pair being located on opposite sides of said ribbon respectively, said ribbon being folded at the spaces thereof between said intervals, each succeeding fold being turned in the opposite direction from the last whereby said groups are arranged in stacked relation and said ribbon serves as a separator between the respective cells of said battery, said battery having two opposite sides substantially entirely open to the surrounding space, the edges of said cell elements and of said ribbon upon said open sides of said battery being exposed along substantially their entire length to said space, and the exposed edges of said ribbon projecting at least $\frac{1}{32}$ inch beyond the exposed edges of the cell elements adjacent thereto.

JOHN B. MULLEN.

REFERENCES CITED

The following references are of record in the file of this patent:

UNITED STATES PATENTS

| Number | Name | Date |
|---|---|---|
| 664,198 | Wetherill | Dec. 18, 1900 |
| 1,467,577 | Folsom | Sept. 11, 1923 |
| 2,040,255 | Gordon | May 12, 1936 |
| 2,042,806 | Schulte | June 2, 1936 |
| 2,157,628 | Rolph | May 9, 1939 |
| 2,209,927 | Nichols | July 30, 1940 |
| 2,272,969 | French | Feb. 10, 1942 |
| 2,416,079 | Anthony | Feb. 18, 1947 |
| 2,433,024 | Burgess | Dec. 23, 1947 |

FOREIGN PATENTS

| Number | Country | Date |
|---|---|---|
| 556,907 | Great Britain | Oct. 27, 1943 |